United States Patent
Hermann et al.

(10) Patent No.: US 8,083,047 B1
(45) Date of Patent: Dec. 27, 2011

(54) TELESCOPING CONVEYOR

(75) Inventors: Reinhold A. Hermann, Manhattan, KS (US); Norbert E. Werner, Dodge City, KS (US)

(73) Assignee: Crustbuster/Speedking, Inc., Dodge City, KS (US)

( * ) Notice: Subject to any disclaimer, the term of this patent is extended or adjusted under 35 U.S.C. 154(b) by 0 days.

(21) Appl. No.: 12/803,727

(22) Filed: Jul. 6, 2010

(51) Int. Cl.
*B65G 15/26* (2006.01)
(52) U.S. Cl. .................. 198/313; 198/588
(58) Field of Classification Search .......... 198/313, 198/588, 812
See application file for complete search history.

(56) References Cited

U.S. PATENT DOCUMENTS

| | | | | |
|---|---|---|---|---|
| 3,598,224 A * | 8/1971 | Oury | ................ | 198/313 |
| 4,643,299 A * | 2/1987 | Calundan | ................ | 198/812 |
| 6,805,229 B2 * | 10/2004 | Dekoning | ................ | 198/313 |
| 7,004,308 B2 * | 2/2006 | Parks et al. | ................ | 198/812 |
| 7,784,597 B2 * | 8/2010 | Frankl et al. | ................ | 198/313 |

* cited by examiner

*Primary Examiner* — James R Bidwell

(57) ABSTRACT

A telescoping conveyor for particulate materials, particularly agricultural materials, uses an elongate support frame to support a telescoping conveyor. A top tube section is telescopically connected to a bottom tube section, the top tube section sliding over the bottom tube section and being supported by the support frame. The bottom and top tube sections respectively have inlet and discharge ends. A conveyor belt runs inside the bottom and top tube sections and has a return portion exteriorly of the tube sections. A belt take up mechanism is positioned in the belt return portion and has direction change rollers affixed to the support frame and to the top tube member and movable therewith in order to maintain belt tension in all telescoping positions of the conveyor.

2 Claims, 4 Drawing Sheets

TELESCOPING CONVEYOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

This invention relates generally to the conveying of granular or bulk materials, and more particularly, to a conveyor reducible in size for use and transport generally in farm and ranch agricultural settings.

2. Background of the Invention

Conveyors are widely used for transporting bulk particulate material, such as seed for planting and seeds from harvested grain. Seeds used for planting or from harvested crops are subject to damage; in the first case, negating their viability and in the second, reducing their value. Consequently, belt conveyors in which an endless driven belt is used are most commonly used for seed transport. Other conveyor configurations, such as auger conveyors are mostly commonly used for moving bulk materials such as silage or commercial grains intended for seed and which are not subject to damage. Seeds or other fragile particulate materials are moved in agricultural operations from bulk storage or seed dispensers, such as bulk seed tenders to planter units and when harvested, from harvester hoppers to grain transport trailers or field trucks and then to storage bins which may be located on the farmstead. The farmer prefers to have his own farmstead grain storage bins so that he may dry grain to a suitable moisture content in a dryer then store the grain himself without elevator storage charges while waiting for an opportune time to sell. Then, the grain must be moved from farmstead storage bins to a transport truck and taken to an elevator, where the grain is either piled outside or stored in still larger bins while awaiting rail or additional truck transport. Thus, seed grain or harvested grain must be moved multiple times, each time exposing the seed to damage and each time under a different set of conditions.

Common farmstead type conveyors for seed transport are belt conveyors, belt because belts are less injurious to seed and are probably less expensive than auger conveyors. These belt conveyors typically use an elongate tube through which an endless belt is driven, the tube supported by transport legs and wheels, the conveyor loading end forming a free standing tripod arrangement with the legs and wheels. The conveyor discharge end dumps the grain into the upper end of a hopper, bin, truck box, planter box, or other receptacle. Farmstead conveyors are made in various lengths from 15 feet to 120 feet. The maximum carry angle of the belt is typically about 25 degrees, so that as taller bins are used for greater storage capacity, ever longer belt conveyors must be used to raise the grain to the needed height. With multiple grain bins, storage buildings, equipment sheds, fences, cattle and hog yards, and the like, the maneuvering area is surprising tight for extra long conveyors.

What is needed is a belt conveyor that is specially adapted for farmstead or small commercial operations and which is portable and adjustable in length so that it can be used within tight confines and for various heights of receptacles. Such belt conveyors may be free standing or mounted to a portable bin carrier, such as a seed tender or grain cart. When mounted to either a seed tender or a grain cart, the advantages of such an adjustable length belt conveyor become quickly apparent. The long conveyor may be selectively reduced in length while the tender or grain cart is under transport and extended when the bin is being emptied. Others have produced folding conveyors but in those configurations, problems are encountered with belt drive mechanisms and belt length take up arrangements.

BRIEF SUMMARY

A telescoping belt conveyor comprising a belt drive mechanism, a belt and belt support apparatus, a belt slack take up arrangement and a telescoping mechanism. The conveyor includes inlet and outlet ends. The conveyor may be configured to be free standing or may be mounted on a portable hopper or bin, such as a seed tender or grain cart. The inlet end may be swingably mounted to hopper or bin support structure so that the conveyor may be swung out and extended for unloading the contents of the hopper or bin into a storage structure or planter seed box.

BRIEF DESCRIPTION OF THE DRAWINGS

For a detailed description of the preferred embodiments of the invention, reference will be made to the accompanying drawings in which.

DETAILED DESCRIPTION OF THE PREFERRED EMBODIMENTS

Figure 1:
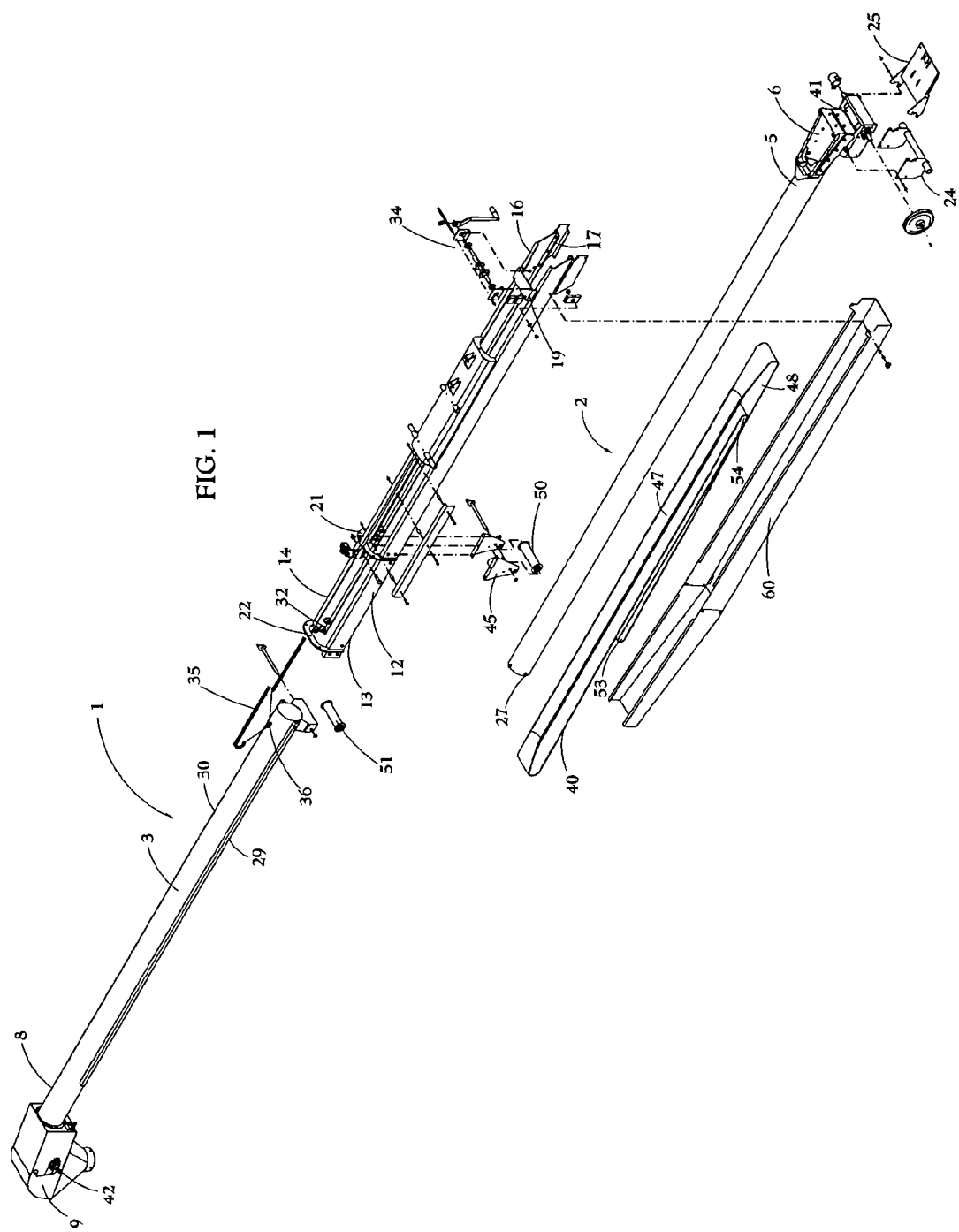
FIG. 1 is a disassembled perspective view of the components of a telescoping conveyor embodying the present invention.

Referring to FIG. 1, a telescoping conveyor 1 is shown which has a bottom tube assembly 2 and a top tube assembly 3 which is sized to fit over and telescopically extend outwardly of the bottom tube assembly 2. Although round tubes are shown, the tubes may be other suitable cross sectional configuration. The bottom tube assembly 2 has connected thereto at its bottom end 5 an inlet hopper 6. The top tube assembly 3 has connected thereto at its top end a discharge funnel 9.

The bottom and top tube assemblies 2 and 3 are connected together and supported in extended and retracted positions by a conveyor support frame assembly 12 having sturdy spaced side rails 13 and 14 each generally of C shaped beam stock with top and bottom flanges 16 and 17. The side rails 13 and 14 are joined in spaced, parallel relation by a lower saddle 19, intermediate connecting arm 21 and upper connecting arm 22. The bottom tube assembly 2 is the smaller in diameter and is supported at its bottom end 5 within the conveyor support frame assembly 12 by a tube mounting bracket 24 joined to a mating mounting bracket 25 on the lower end of the frame assembly 12. The forward or upper portion of the bottom tube assembly 2 is free floating and held within the top tube assembly 3 by guides 27. The top tube assembly 3 fits over the bottom tube assembly 2 and is supported not by the bottom tube assembly 2 but by the conveyor support frame assembly 12. Opposed longitudinal guide rails 29 and 30 are affixed substantially the length of the top tube assembly 3 and run between upper and lower sets of rollers 32 mounted to the inside surfaces of the side rails 13 and 14. By using the frame assembly 12 to support the top tube assembly 3, the top tube can be constructed of lightweight material sufficient to carry the load of conveyed materials and an inside conveyor belt. To extend and retract the top tube assembly 3 relative to the bottom tube assembly 2 and the conveyor support frame assembly 12, either manual means or power means may be used. In the illustrated example, a manually operated cranked winch 34 is mounted upon the lower saddle 19 and winds a chain 35 extending around a pulley bracket 36 mounted adjacent the lower end of the top tube assembly 3. The winch 34 extends the top tube assembly 3 and a winch lock maintains extended position. Retraction is by winch reversal. A powered winch, either electric or hydraulic, may be substituted, or a ram may be used.

The telescoping conveyor 1 uses a belt 40, such as an eight inch wide belt of conventional flexible rubber belting material. Ideally, the belt 40 has its carrying capacity and angular lift capability increased over a flat surfaced belt by the use of a deeply textured surface or cleats. The belt 40 is entrained between opposite end rollers, the lower end around a powered roller 41 and the upper end around a slave roller 42 within the discharge funnel 9. The belt 40 runs through the bottom and top tube assemblies 2 and 3. For purposes of illustration, the continuous belt portion conveying material inside the tubes identified as the carrying section 47 and the return section as 48. The belt 40 in the carrying section 47 tends to curl laterally with the tube curvature 49 and as the belt 40 passes around the rollers 41 and 42, it flattens out. The take up mechanism acts upon the belt return section 48 and includes a first roller 50 which is fixed in position and second roller 51 which moves longitudinally. The first, fixed, roller 50 is mounted beneath the support frame assembly 12 adjacent the upper end and is below the bottom tube assembly 2. The second, movable, roller 51 is mounted below the lower end of the top tube assembly 3. As shown in FIG. 1, the belt return section 48 makes an upper loop 53 and a lower loop 54. The upper loop 53 travels around the second, outer, movable, roller 51 and the lower loop 54 around the first, lower, fixed, roller 50. Consequently, as the top tube assembly 3 extends, the distance between the rollers 50 and 51 in the belt return section 48 shortens, allowing an equal amount of belt 40 in the carrying section 47 to be lengthened within the extending telescoping tubes. Conversely, when the tube assembly 3 retracts, the distance between rollers 50 and 51 in the belt return section 48 lengthens, allowing an equal amount of belt 40 in the carrying section 47 to be shortened.

A cover or guard 60 is mounted to the underside of the conveyor support frame assembly 12 and encloses the belt return section 48 and take up mechanism 45.

Figure 2:
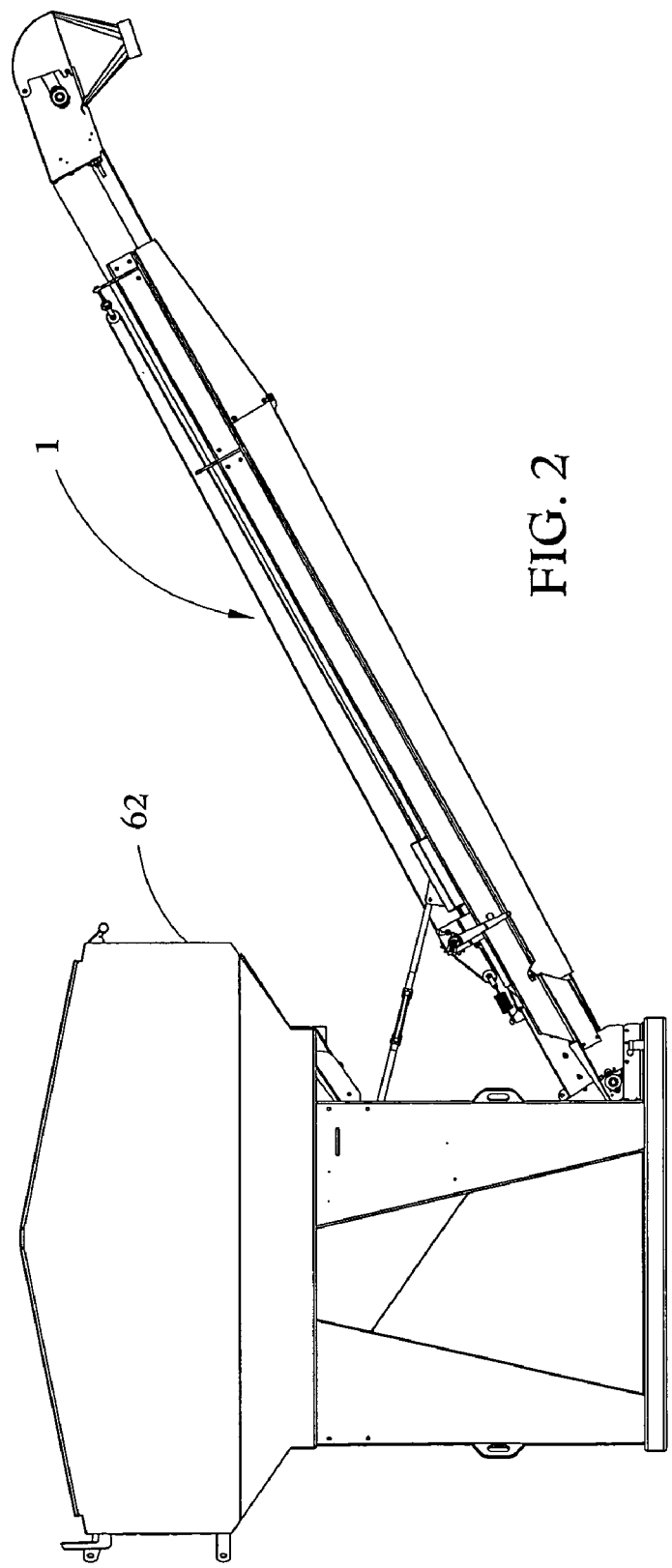
FIG. 2 is an elevational view of the telescoping conveyor mounted on a portable seed tender and showing the conveyor retracted.
Figure 3:
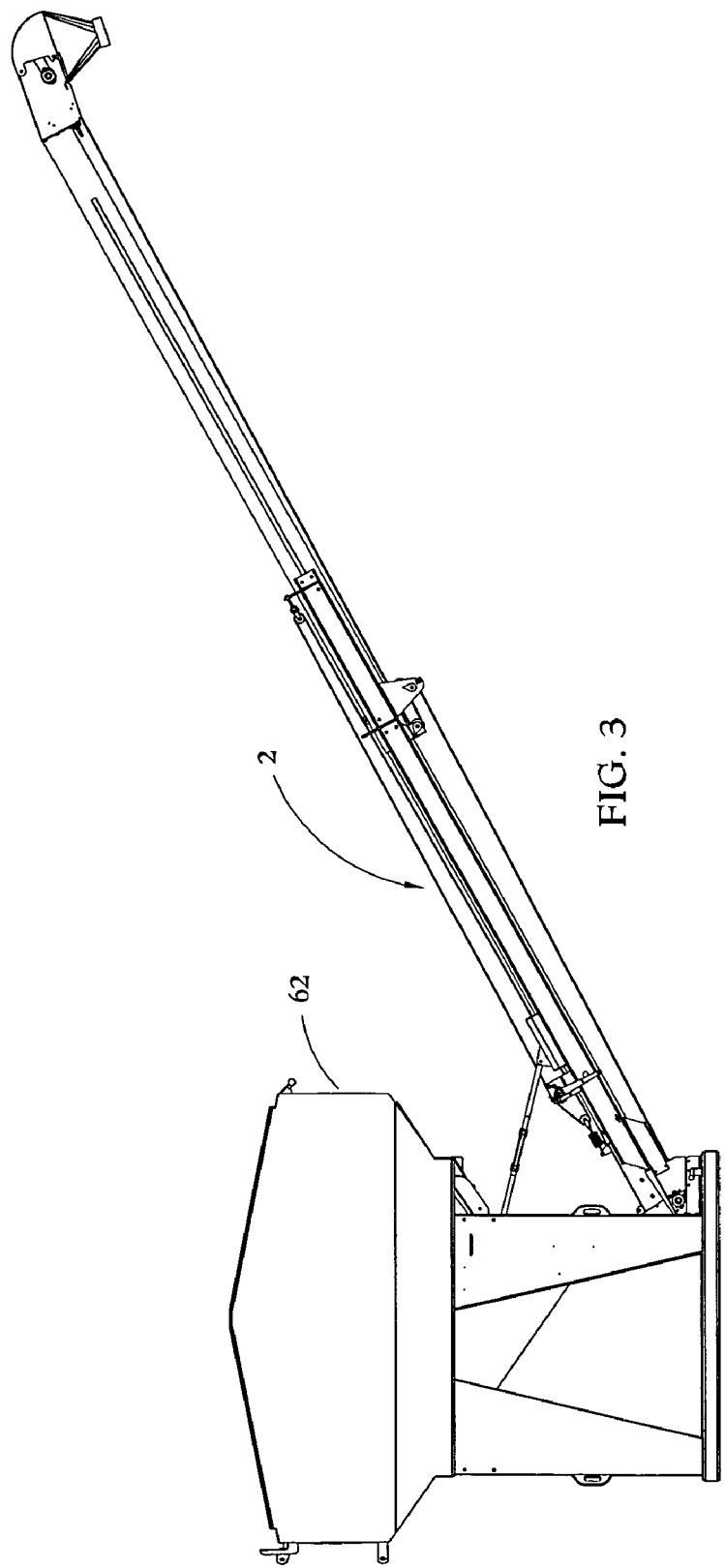
FIG. 3 is an elevational view of the telescoping conveyor mounted on a portable seed tender and showing the conveyor extended.

FIGS. 2 and 3 show the telescoping conveyor 1 used as an unloading device for a bulk seed tender 62. The bulk seed tender may be cart mounted and transportable to field planter and drill implements or may be stationary, where such implements are towed to the bulk seed tender site and the implement seed boxes filled. The extendible telescoping conveyor 1 allows the implement operator to reach all seed boxes for filling, depending of course upon the conveyor 1 being correspondingly sized for the width of planter or drill implement.

Figure 4:
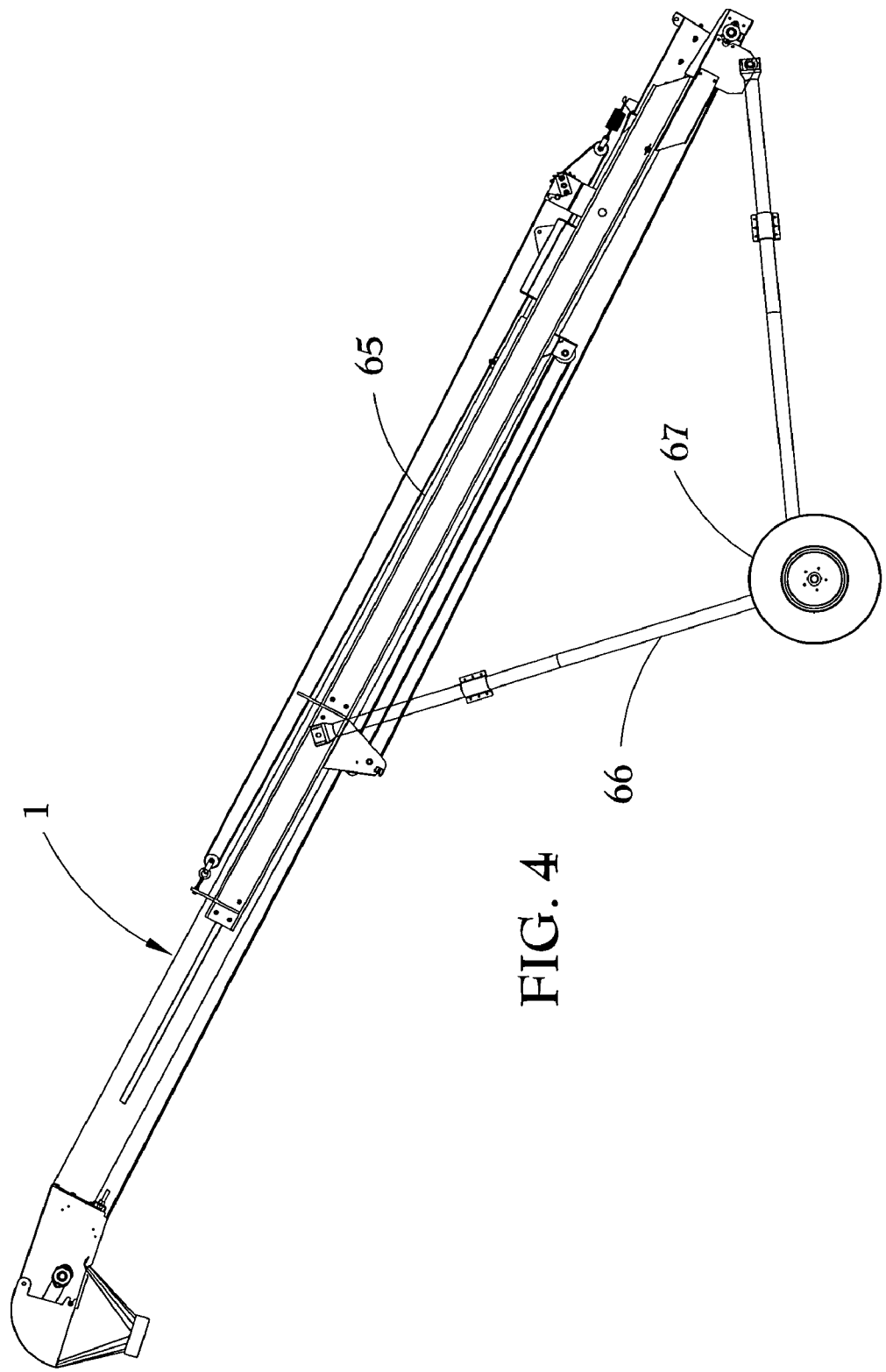
FIG. 4 is an elevational view of the telescoping conveyor configured as a free standing or field conveyor.

FIG. 4 shows the telescoping conveyor 1 as a field conveyor 65 with self support legs 66 and wheels 67. Field conveyors 65 are employed in general farm and industry use.

We claim:

1. A telescoping conveyor for particulate material and used as a fixed or a transportable unit, the conveyor comprising:
    a. an elongate support frame;
    b. a bottom tube section mounted to said support frame;
    c. a top tube section telescopically joined to said bottom tube section and extendible therefrom, the top tube section being extendibly mounted to said support frame and supported thereby through a series of roller guides such that when extended and retracted the top tube section is not substantially supported by said bottom tube section;
    d. the bottom and top tube sections respectively having an inlet and discharge ends;
    e. a conveyor belt arranged through said bottom and top tube sections; and
    f. a belt take up mechanism operable to accommodate telescoping of said bottom and top tube sections.

2. A telescoping conveyor for particulate material and used as a fixed or a transportable unit, the conveyor comprising:
    an elongate support frame;
    a bottom tube section mounted to said support frame;
    a top tube section telescopically joined to said bottom tube section and extendible therefrom, the top tube section being extendibly mounted to said support frame and supported thereby through a series of guide rollers when extended and retracted, the top tube section not being substantially supported by said bottom tube section;
    the bottom and top tube sections respectively having an inlet and discharge ends;
    a conveyor belt running inside said bottom and top tube sections and having a return portion exteriorly of said tube sections; and
    a belt take up mechanism positioned in said belt return portion and having a first member affixed to said support frame and a second member affixed to said top tube member and movable therewith, the belt take up mechanism operable to maintain belt tension in all telescoping positions of said conveyor.

* * * * *